(No Model.)
C. GOINGS.
CARRIAGE SEAT FASTENER.
No. 565,345. Patented Aug. 4, 1896.
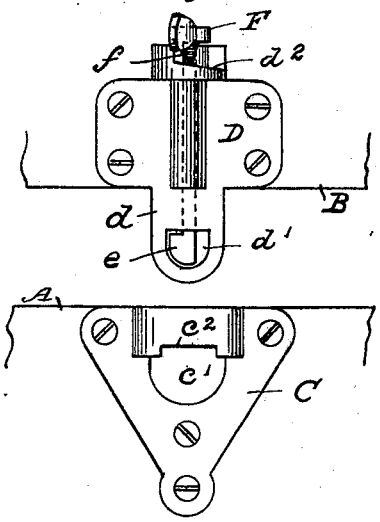
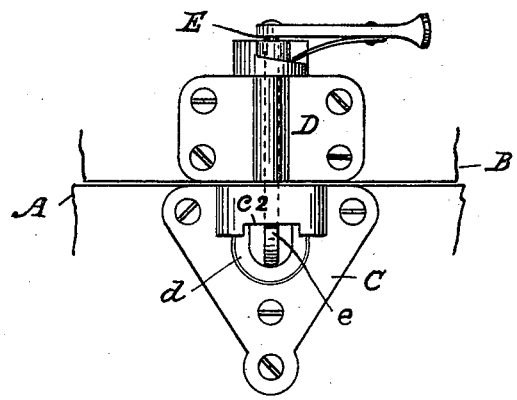
Witnesses  Inventor
Stella J. Emery  Claude Goings
A. J. Jenkins  By his Attorney J. B. Thurston

UNITED STATES PATENT OFFICE.

CLAUDE GOINGS, OF NEW LONDON, NEW HAMPSHIRE.

CARRIAGE-SEAT FASTENER.

SPECIFICATION forming part of Letters Patent No. 565,345, dated August 4, 1896.

Application filed October 11, 1895. Serial No. 565,347. (No model.)

*To all whom it may concern:*

Be it known that I, CLAUDE GOINGS, a citizen of the United States, residing at New London, in the county of Merrimac and State of New Hampshire, have invented certain new and useful Improvements in Carriage-Seat Fastenings; and I do hereby declare the following to be a full, clear, and exact description of the invention, such as will enable others skilled in the art to which it appertains to make and use the same.

This invention relates more especially to those carriage-seats which are designed to be adjusted to various positions, or to carriages designed to be transformed from a two or three seated to a single-seated vehicle, the objects of the invention being to provide a positively safe locking device for the seats of carriages or wagons, and one which shall be at once strong, easy of manipulation, and not capable of accidental displacement.

The invention consists of tongue and socket plates, of a construction permitting the use of the novel locking device which secures one to the other, as fully set forth in the following specification and claims, and clearly illustrated in the accompanying drawings, forming a part of the same, of which—

Figure 1 represents both members of my improved fastening as when in position to be united. Fig. 2 is a similar view showing the parts united, Fig. 3 being a detached plan view of the socket member of my improved carriage-seat fastening.

Similar reference-letters represent corresponding parts in all the views.

The lines A B represent the adjacent portions, respectively, of a wagon and a detachable seat therefor.

C is the socket member of my improved fastening, which in the drawings is represented as attached to a wagon-body, and D is the tongue member, which is shown as attached to a seat; but the reverse position of the parts named will serve equally as well.

The socket member C consists of a flat plate having upon its back side a recess $c$, which may be provided with a perforation $c'$, as shown, forming the flat shoulder $c^2$, for a purpose to be hereinafter explained.

The tongue member D consists of a plate having a tongue $d$ projecting from its lower edge downward, and adapted to fit the recess $c$ of the socket member, said tongue $d$ being perforated near its lower end, as at $d'$. (Shown best in Fig. 1.)

The catch or locking device consists of a vertical rotative shaft E, which is mounted in the member D, and is provided at its lower end with a lateral projection $e$, which rests normally within the perforation $d'$ of the tongue $d$, in a position flush with its face; but when said tongue has entered the recess $c$ of the socket member C the latch or vertical shaft E may be then rotated by means of a handle-lever F, so that the catch or projection $e$ shall reach through the perforation $d'$ of the tongue $d$ and into the perforation $c'$ of the member C, bearing under the shoulder $c^2$, and thus firmly lock the body and seat members of my improved fastening.

As a means of preventing the accidental displacement of the handle-lever F, which might allow the shaft E to become turned sufficiently to release the catch $e$ from the bearing or shoulder $c^2$, I provide the lever F with a spring-arm $f$, the free end of which bears upon a curved projection $d^2$, the upper surface of the projection being formed on a spiral decline, said spring-arm resting upon the lower portion when the catch $e$ is in engagement with the shoulder $c^2$ and upon the highest portion when said latch $e$ is disengaged.

The plates C D will be secured to their respective parts by ordinary screws, as shown.

Having fully described my improvements, what I claim is—

1. In a tongue-and-socket carriage fastening, a tongue having a perforation near its lower end, a socket having a perforation registering with that of the said tongue, and a locking device consisting of a spindle mounted vertically and capable of rotary movement within said tongue and having at its lower end a lateral projection, and means for rotating the spindle and causing its projection to enter the perforations of the said tongue and socket.

2. In a tongue-and-socket carriage-seat fastening, a tongue having a perforation near its lower end, a socket having a perforation registering with that of said tongue, a locking device consisting of a spindle mounted and capable of rotary movement within said tongue and having at its lower end a lateral projection and at its upper end an arm for rotating the same, and means whereby the projection of said spindle will maintain engagement with the perforation of said socket member.

3. A carriage-seat fastening comprising a tongue and socket member, the tongue member consisting of a plate having perforations for the reception of fastening-screws, a tongue projecting at its lower edge provided with a lateral perforation, and a lateral projection at the top of said plate having its upper surface spirally inclined, a spindle mounted vertically and capable of rotary movement within said tongue member provided at its upper end with an arm having a spring bearing upon said spirally-inclined projection and at its lower end a lateral projection adapted to enter the perforation of said tongue, and the socket member consisting of a plate perforated for the reception of fastening-screws and containing a socket having a perforation registering with that of said tongue, all substantially for the purpose set forth.

In testimony whereof I affix my signature in presence of two witnesses.

CLAUDE GOINGS.

Witnesses:
J. B. THURSTON,
CHAS. E. STEARNS.